United States Patent [19]

Hikasa et al.

[11] Patent Number: 5,308,699
[45] Date of Patent: May 3, 1994

[54] THERMOPLASTIC ELASTOMER POWDER FOR POWDER SLUSH MOLDING POWDER SLUSH MOLDING METHOD USING THE SAME AND MOLDED ARTICLE THEREOF

[75] Inventors: Tadashi Hikasa, Kimitsu; Hiroaki Mendori; Tatsuo Hamanaka, both of Ichihara; Toshio Igarashi, Kyoto; Yuu Shida, Takatsuki, all of Japan

[73] Assignee: Sumitomo Chemical Company Limited, Osaka, Japan

[21] Appl. No.: 769,733

[22] Filed: Oct. 2, 1991

Related U.S. Application Data

[63] Continuation-in-part of Ser. No. 636,277, Dec. 31, 1990, abandoned.

[30] Foreign Application Priority Data

Oct. 3, 1990 [JP] Japan ................................. 2-267298
Aug. 8, 1991 [JP] Japan ................................. 3-199579

[51] Int. Cl.$^5$ ...................... C08L 23/26; C08L 23/16; C08J 3/24; C08J 3/12
[52] U.S. Cl. ................................... 428/402; 525/193; 525/194; 525/240; 525/106; 524/261; 524/269; 264/310; 264/331.17
[58] Field of Search ...................... 525/240, 194, 193; 428/402

[56] References Cited

U.S. PATENT DOCUMENTS

| | | | |
|---|---|---|---|
| 2,992,201 | 7/1961 | Gober, Jr. ............................ | 524/269 |
| 3,399,156 | 8/1968 | Bell, Jr. .............................. | 524/269 |
| 3,758,643 | 9/1973 | Fischer ............................... | 525/240 |
| 3,811,903 | 5/1974 | Daskivich ........................... | 524/269 |
| 4,130,535 | 12/1978 | Coran et al. ....................... | 525/194 |
| 4,267,080 | 5/1981 | Yokoyama et al. ................. | 525/194 |
| 4,319,004 | 3/1982 | Spielau et al. ...................... | 525/240 |
| 4,748,206 | 5/1988 | Nogiwa et al. ..................... | 525/240 |

FOREIGN PATENT DOCUMENTS

| | | |
|---|---|---|
| 0087210 | 8/1983 | European Pat. Off. . |
| 0338860 | 1/1990 | European Pat. Off. . |
| 58-132507 | 8/1983 | Japan . |
| 2-57309 | 2/1990 | Japan . |
| 2-57310 | 2/1990 | Japan . |

OTHER PUBLICATIONS

H. S. Kaufman et al., "Introduction to Polymer Science and Technology: An SPE Textbook", Oct. 1985, p. 556.
Derwent Publications Ltd., An 90-104961 & JP A 2-057309 Feb. 1990 Abstract.

*Primary Examiner*—Carman J. Seccuro, Jr.
*Attorney, Agent, or Firm*—Cushman, Darby & Cushman

[57] ABSTRACT

A thermoplastic elastomer powder for powder slush molding, comprising an elastomer composition of an ethylene-α-olefin copolymer rubber and a polyolefin resin, wherein said elastomer composition has a complex dynamic viscosity $\eta^*(1)$ as measured at a frequency of 1 radian/sec. in a dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less:

$$n = [log\eta^*(1) - log\eta^*(100)]/2.$$

15 Claims, 3 Drawing Sheets

THERMOPLASTIC ELASTOMER POWDER FOR POWDER SLUSH MOLDING POWDER SLUSH MOLDING METHOD USING THE SAME AND MOLDED ARTICLE THEREOF

CROSS-REFERENCE OF RELATED APPLICATION

This application is a continuation-in-part of Ser. No. 636,277 filed Dec. 31, 1990, now abandoned.

BACKGROUND OF THE INVENTION

1. Field of the Invention

The present invention relates to an olefin type thermoplastic elastomer powder for powder slush molding, a powder slush molding method using the same, and a molded article thereof. More specifically, it relates to a thermoplastic elastomer powder for powder slush molding which is suitable for use, mainly, as covering materials and housings for molded articles in various fields, irrespective of backing materials, a powder slush molding method using the same and a molded article thereof.

2. Description of the Related Art

With regard to covering materials used as interior decorative materials for automobiles, there is an increasing demand for those which have a light weight and a good and soft feeling, and which can be given an embossed pattern or stitch pattern to increase the value of molded articles. Also, during the scrapping of cars, acidic substances are generated by a combustion of such interior decorative materials to cause a contamination of the air, and thus create serious social problems such as acid rain, etc., and therefore, there is a strong demand for non-polluting materials.

Known covering materials of the prior art are vacuum molded olefin type thermoplastic elastomer (hereinafter called TPO) sheets and vacuum formed sheets composed mainly of vinyl chloride resins and ABS resins, or rotational molded or slush molded sols composed mainly of vinyl chloride resins for paste and plasticizers (hereinafter called sol moldings).

Vacuum formed TPO sheets attain the objects to provide a light weight and non-polluting material, but it is difficult to impart complicated shapes thereto.

Also, vacuum formed sheets contain a high residual molding stress caused during the forming process, and thus have a drawback in that cracks will appear after long term usage.

Vacuum formed sheets composed mainly of vinyl chloride resins and ABS resins have drawbacks similar to those of vacuum formed TPO sheets in that it is difficult to impart complicated shapes thereto, and further that, compared with TPO, they have the drawback of heavier weight and cause pollution.

Sol moldings composed mainly of vinyl chloride resins for paste and plasticizers give a soft feeling, and complicated shapes can be imparted thereto. However, since the gellation temperature is low, they melt rapidly while being molded, and thus many drawbacks arise, for example, problems in the processing such as flow marks, lip or a sol fiber-forming phenomenon, the inherent problems of vinyl chloride such as a heavier weight and pollution, and further problems in that the inner window glass surface of automobiles produced from said sol molding suffers from hazy appearance due to the use of a large amount of plasticizers.

Due to these drawbacks and problems of the molding method, the powder slush molding method has recently attracted attention.

Powder molding methods include, in general, a flow dipping method, an electrostatic coating method, a flame spray coating method, a powder rotational molding method, and a powder slush molding method, and particularly for an interior decorative materials for automobiles, the powder slush molding method is most suitable.

A partially crosslinked TPO composition is known from Japanese Unexamined Patent Publications (Kokai) Nos. 48-26838, 53-149240, but the known molding methods currently used for the partially crosslinked TPO are:

a. injection molding (shear rate during processing: $\dot{\gamma} \geqq 10^3 \text{ sec}^{-1}$);
b. extrusion molding ($10^1 \leqq \dot{\gamma} \leqq 10^2 \text{ sec}^{-1}$);
c. calendering ($10^2 \leqq \dot{\gamma} \leqq 10^3 \text{ sec}^{-1}$);
d. compression molding of the primarily processed product in b. or c.; and
e. vacuum forming of the primarily processed product in b. or c., but all of these methods require the molding temperatures are higher or equal to the softening point, and the molding pressures must be varied depending on the viscosities and the shear rates corresponding to the respective processing conditions.

Nevertheless, in the molding method such as a powder slush molding at a shear rate of $10^0 \text{ sec}^{-1}$ or less or under an approximately stationary state of the polymer, at a vibration frequency of 1 radian/sec., and with no application of a pressure or under a very low pressure ($\leqq 1 \text{ kg/cm}^2$), the flowability becomes extremely poor, and accordingly, the molding becomes very difficult. Further, even if molding is possible, the poor flowability in the low shear rate region cause an incomplete thermal fusion between powder particles, and only molded articles with a low mechanical strength can be obtained.

For this reason, for example, Japanese Unexamined Patent Publication (Kokai) No. 2-57310 discloses the following inventions:

"1) An embossed thermoplastic elastomer molding, having an emboss pattern formed on the surface produced by spraying of a thermoplastic elastomer powder comprising a polyolefin resin and an ethylene-α-olefin copolymer rubber onto the inner surface of a heated mold with an emboss pattern, thereby melting and adhering said powder to the inner surface of said mold.

2) A method of preparing an embossed thermoplastic elastomer molding having an emboss pattern on the surface according to a slush molding method, which comprises spraying a thermoplastic elastomer powder comprising a polyolefin resin and an ethylene-α-olefin copolymer rubber onto the inner surface of a previously heated mold with an emboss pattern, thereby melting and adhering said powder to the inner surface of said mold, and then cooling said mold."

Thus, there is an example in which an improvement is effected by melting and then adhering TPO with a low flowability in a low shear rate region to the inner surface of the previously heated mold by a spray gun.

According to this method, however, because the powder is fed and adhered to the inner portion of the mold, problems arise in that the sheet thickness of the molding becomes nonuniform, and that pinholes may be formed.

Also, because the powder is sprayed onto a previously heated mold in the open state without being close contact with the powder feeding box and adhered to the inner surface of the mold, the problems arise of a scattering of the powder outside and an entrainment of foreign matter from outside, and a molding fully satisfying the appearance, physical properties and another requirements has not been obtained.

SUMMARY OF THE INVENTION

An object of the present invention is to solve the above problems and provide a thermoplastic powder for powder slush molding which has a high flowablility even when substantially no forming pressure is applied, by which a molding having a required high thermal fusion strength between powder particles can be obtained without pinholes, by no using the above spraying method with, for example, a spray gun, a powder slush molding method using the same, and a molded article thereof.

Other objects and advantages of the present invention will be apparent from the following description.

1) In accordance with the present invention, there is provided a thermoplastic elastomer powder for powder slush molding, comprising an elastomer composition of an ethylene-α-olefin copolymer rubber and a polyolefin resin, wherein said elastomer composition has a complex dynamic viscosity $\eta^*(1)$ as measured at a frequency of 1 radian/sec. in a dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less:

$$n = \{log\eta^*(1) - log\eta^*(100)\}/2.$$

2) In accordance with the present invention, there is also provided a thermoplastic elastomer powder for powder slush molding, comprising a partially crosslinked type elastomer composition comprising a mixture of an ethylene-α-olefin copolymer rubber and a polyolefin resin dynamically crosslinked in the presence of a crosslinking agent, wherein said elastomer composition has a complex dynamic viscosity $\eta^*(1)$ as measured at a frequency of 1 radian/sec. in a dynamic viscoelasticity measurement at 250° C. of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less:

$$n = \{log\eta^*(1) - log\eta^*(100)\}/2.$$

and also

3) In accordance with the present invention, there is further provided a thermoplastic elastomer powder for powder slush molding as defined in 2) above, wherein a crosslinking coagent is used in combination in the dynamic crosslinking.

4) In accordance with the present invention, there is further provided a powder slush molding method using a thermoplastic elastomer powder as defined in 1), 2) or 3) above and the molded article thereof.

BRIEF DESCRIPTION OF THE DRAWINGS

The present invention will be better understood from the description set forth below with reference to the accompanying drawings, in which the powder feeding box and the mold used in Example 1-6, are shown as follows.

DESCRIPTION OF THE PREFERRED EMBODIMENTS

According to the present invention, by utilizing the specific features of a powder slush molding method which can form moldings with a small residual molding stress, a low hardnes and a complicated shape, covering materials, particularly for interior decorative materials of automobiles, made of a thermoplastic elastomer having a light weight and non-polluting can be provided.

In the present invention, the powder slush molding method refers to molding methods described in the Claim of Japanese Unexamined Patent Publication (Kokai) No. 58-132507.

Namely, the powder slush molding method of the present invention comprises the steps of fixing a vessel having an opening and containing a necessary amount of a thermoplastic elastomer powder to a mold having an opening heated to a temperature sufficiently higher than the melting temperature of the thermoplastic elastomer powder, with the openings being matched to each other or fixing the vessel in the hollow portion of the mold to be integrated by quickly feeding the powder to the respective portions within the mold while the mold is rotated and/or rocked, to cause the powder to be melted and adhered thereto, and if necessary, discharging the superfluous powder into the vessel.

Specifically, for example, this is a method in which a mold with a surface temperature of 140° C. or higher, preferably 160° C. or higher and a vessel having an opening (a powder feeding box), which are integrated, are rotated or rocked to feed the thermoplastic elastomer powder onto the inner surface of the mold through a natural flow, primarily due to the weight of the thermoplastic elastomer powder (without spraying the powder onto the inner surface of the mold by a spray gun etc.), the elastomer powder is melted and adhered to a uniform thickness by a thermal conduction from the mold, unadhered powder is recovered to the powder feeding box, the mold is separated from the powder feeding box, and thereafter, a thermal fusion of the melted and adhered powder is carried out under only the heat possessed by the mold or by an external application of heat followed by cooling and demolding to give a molding with a good appearance and mechanical strength.

The mold heating system to be used in the present invention includes the gas-fired furnace system, heated oil circulation system, dipping into a heated oil or a hot fluidized sand, and a high frequency induction heating system.

The thermoplastic elastomer powder to be used in this powder slush molding method must have a high powder flowability under a low shear rate and a low pressure, and be easily melted by the heat supplied primarily from the mold.

The specific feature of the present invention resides in an elastomer composition having a certain specific viscoelasticity comprising mixtures of ethylene-α-olefin copolymer rubbers and polyolefin resins, optionally dynamically partially crosslinked therewith in the presence of a crosslinking agent, and in the use of a thermoplastic elastomer powder obtained by powdering said elastomer composition at a lower temperature than the glass transition temperature. By the use of said thermoplastic elastomer, it has become possible to carry out molding requiring a high flowability under a low shear rate such as a powder slush molding method.

The ethylene-α-olefin copolymer rubber used in the present invention includes rubbers composed mainly of olefins, including ethylene-propylene copolymer rubbers, ethylene-propylene-nonconjugated diene copolymer rubbers ethylene-butene-1 copolymer rubbers, ethylene-butene-1-nonconjugated diene copolymer rubbers and the like. Examples of nonconjugated dienes preferably usable include dicyclopentadiene, ethylidenenorbornene, 1,4-hexadiene, cyclooctadiene, methylene-norbornene and the like, and among them, ethylene-propylene-ethylidenenorbornene rubber (hereinafter abbreviated EPDM) provides an elastomer powder having a high heat resistance and superior tensile characteristics. Particularly, an oil-extended olefin copolymer rubber containing 30 to 120 parts by weight of a mineral oil type softener such as paraffinic process oil per 100 parts by weight of an ethylene-α-olefin copolymer rubber having a Mooney viscosity ($ML_{1+4}$ 100° C.) of 130 to 350, preferably 200 to 300, as measured at 100° C. according to ASTM D-927-57T, is preferable since a good balance between the tensile characteristics and the flowability can be obtained.

As the polyolefin resin, polypropylenes or copolymers of propylene with α-olefins are preferably used. Particularly, the use of a copolymer resin of propylene and an α-olefin enables the hardness of the molding to be lowered. Preferably, propylene-ethylene-1 random or block copolymer resins, propylene-butene-1 random or block copolymers resins may be employed. The above polyolefin resin preferably has a melt flow rate (MFR) of 20 g/10 min. or more, more preferably 50 g/10 min. or more, as measured at 230° C. under a load of 2.16 kg according to JIS K-7210. A thermoplastic elastomer powder prepared by using a polyolefin resin with a melt flow rate of less than 20 g/10 min. cannot provide a molding having a high strength, because the powder is only softened during powder slush molding, and therefore, it is difficult to cause the powder particles to be melted and adhered to each other. The formulation ratio of the ethylene-α-olefin copolymer rubber to the polyolefin resin is preferably 5% by weight to 80% by weight, more preferably 20% by weight to 80% by weight of the ethylene-α-olefin copolymer rubber and preferably 20% by weight to 95% by weight, more preferably 20% by weight to 80% by weight of the polyolefin resin, when the total amount of the both components is 100% by weight.

An organic peroxide is preferably employed as the crosslinking agent which dynamically crosslinks the mixture of the ethylene-α-olefin copolymer rubber and the polyolefin resin, and a dialkyl peroxide is preferably employed as the organic peroxide. More preferably, an extremely small amount of an organic peroxide is employed in the presence of a crosslinking coagent such as a bismaleimide compound, to effect a dynamic crosslinking. This enable the ethylene-α-olefin copolymer to be adequately crosslinked to provide a high heat resistance, and at the same time, a high flowability. In this case, the crosslinking coagent is preferably used in an amount of 1.5 part by weight or less, more preferably 0.6 part by weight or less, per 100 parts by weight of the mixture of the ethylene-α-olefin copolymer rubber and the polyolefin resin. The organic peroxide as the crosslinking agent is preferably also used in an amount of 0.4 part by weight or less, more preferably 0.1 part by weight or less, most preferably 0.07 part by weight or less.

As the apparatus to be used for the dynamic crosslinking, a continuous kneading extruder such as a single screw extruder or a twin screw extruder is preferably used. Particularly, it is preferable to effect a continuous extrusion crosslinking at a maximum shear rate $\dot{\gamma}$ max $\leq 10^3$ sec$^{-1}$ by using a twin screw extruder. If the extrusion crosslinking is effected at $\dot{\gamma}$ max $< 10^3$ sec$^{-1}$, the size of the dispersed particles of the ethylene-α-olefin copolymer rubber become too large, and thus it unpreferably causes a poor appearance of the product.

The present elastomer composition has a complex dynamic viscosity $\eta^*(1)$ measured at a frequency of 1 radian/sec. in a dynamic viscoelasticity measurement at 250° C. of $1.5 \times 10^5$ poise or less, preferably $1.0 \times 10^5$ poise or less, more preferably $3.0 \times 10^4$ poise or less.

If the complex dynamic viscosity $\eta^*(1)$ measured at a frequency of 1 radian/sec. exceeds $1.5 \times 10^5$ poise, the elastomer powder prepared by using such an elastomer composition will not be melted and adhered to the mold surface, and thus the molding such as the powder slush molding under an extremely low shear rate of 1/sec cannot be effected by use of said elastomer powder.

The present elastomer composition has a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less, preferably 0.60 or less, more preferably 0.53 or less in the dynamic viscoelasticity measurement at 250° C.:

$$n = \{log\eta^*(1) - log\eta^*(100)\}/2.$$

If the Newtonian viscosity index n exceeds 0.67, even if the complex viscosity $\eta^*(1)$ is $1.5 \times 10^5$ poise or less, the dependency of the complex dynamic viscosity on the frequency becomes greater, and thus a mutual thermal fusion between the molten elastomer powder particles is not incompleted in a powder slush under a very low shear rate of 1/sec. or less and a very low pressure of 1 kg/cm² or less, such a powder slush molding produces only moldings having a low mechanical strength.

In the present invention, the molding obtained by using the thermoplastic elastomer powder preferably has a hardness (shore D) of 45 or less.

If the hardness (shore D) exceeds 45, the molding becomes too hard and gives not only an undesirable hard feeling, but also an undesirably poor protection of occupants of a vehicle during a collision when used as covering material for interior decoratives of an automobiles.

In the present invention, preferably the elastomer composition is pulverized by the freezing pulverization method using liquid $N_2$. Pellets of the elastomer composition cooled to a pulverizing temperature of $-40°$ C. or lower, preferably $-70°$ C. or lower, more preferably $-90°$ C. or lower, can be obtained by the mechanical pulverization method using a hammer mill, a pin mill etc.

If the composition is pulverized at a temperature higher than $-40°$ C., the particle sizes of the pulverized elastomer powder are coarsened, and thus the powder slush moldability is undesirably lowered. To prevent an elevation of the polymer temperature to the glass transition temperature or higher during the pulverization operation, preferably a method having little heat generation and a high pulverization efficiency is employed.

Also, preferably a pulverization apparatus which is cooled by an external cooling source is employed.

The elastomer powder obtained is preferably pulverized to the extent such that 95% or more of the total weight passes through a 32 mesh Tyler standard sieve. If the accumulation ratio on the 32 mesh sieve exceeds 5%, thickness irregularities are generated during the powder slush molding. These thickness irregularities cause irregularities to the flexibility of the molding whereby, for example, bending wrinkles are formed, and lower the commercial value of the molding.

In the elastomer powder of the present invention, an organic or inorganic fine particulate powder can be added, to prevent reagglomeration (mutual adhesion). This addition can be made before or after the classification, but an addition before the classification is more efficient because the classification and blending operations thus can be performed at the same time.

The organic or inorganic fine particulate powder is a fine powder having an average particle size of 50 μm or less and having higher glass transition temperature or higher melting temperature than room temperature. For example, there are included polyolefin resin powder, talc, kaolin, silicon oxide, and alumina oxide, but a polyolefin resin powder is particularly preferable in that the thermal fusion strength between the elastomer powder particles is not lowered during the molding. The polyolefin resin as the mutual adhesion preventive agent is preferably added in an amount of from 0.2 to 20 parts by weight based on 100 parts by weight of the elastomer powder. If this amount is less than 0.2 part by weight, it is slightly difficult to prevent a mutual adhesion, and if more than 20 parts by weight, the flexibility is undesirably impaired. Therefore, more preferably it is 0.5 to 15 parts by weight.

The elastomer composition in the present invention can be formed into an elastomer composition having an excellent flexibility by blending an uncrosslinked ethylene-α-olefin copolymer rubber or a polyolefin resin in an amount of 50 parts by weight or less based on 100 parts by weight of the partially crosslinked type elastomer composition. As the α-olefin, propylene and butene-1 may be used alone or in combination. Particularly, an ethylene-propylene copolymer rubber, ethylene-butene-1 copolymer rubber, ethylene-propylene-nonconjugated diene copolymer rubber or ethylene-butene-1-nonconjugated diene copolymer rubber with an ethylene content of 40 to 90% by weight, preferably 70 to 85% by weight, and having a $ML_{1+4}$ 100° C. of 50 or less, is employed.

During the demolding of the powder slush molded product by an elastomer powder, the adhesion thereof to the inner mold surface is sometimes strong, and thus defects such as bending wrinkles or whitening may be generated when the demolding is forcibly attempted. Accordingly, it is often necessary before molding to coat the inner mold surface with a mold release agent generally employed, such as dimethylpolysiloxane. For a continuous production of many moldings, however, the mold release agent must be coated for every few moldings, which will lead to increased costs. In such a case, although an improvement of the mold material is possible, the method of adding 2 parts by weight or less of a methylpolysiloxane compound as the internally added mold release agent per 100 parts by weight of the elastomer composition or the elastomer powder is effective. The addition in this case may be made either before or after the powdering. In this case, a methylpolysiloxane compound having a viscosity at 25° C. of 20 centistokes or more may be employed. The preferable viscosity range is 50 to 5000 centistokes; if the viscosity is too high, the effect of the mold release agent is reduced. On the other hand, if the amount of the internally added mold release agent is larger than 2 parts by weight, the thermal fusion between the elastomer powder particles is inhibited and only a molding having a low mechanical strength can be obtained. Also, the internally added mold release agent bleeds out onto the mold surface, the mold is undesirably contaminated. Further, by controlling the amount of the internally added mold release agent, a reagglomeration after powdering can be reduced.

In the present invention, known heat-resistant stabilizers such as phenol type, sulfite type, phenylalkane type, phosphite type, amine type or amide type stabilizers, antioxidants, weathering resistant stabilizers, antistatic agents, metal soaps, lubricants such as waxes, and pigments for coloration can be formulated in necessary amounts.

The molded articles according to the present invention can be applicable as products in the following various fields.

In the automobile fields, for example, various automobile parts including interior cover materials of, for example, instrument panels, console boxes, arm rests, head rests, door trims, rear panels, pillar trims, sunvisors, trunk room trims, trunk lid trims, air bag covers, seat buckles, head liners, gloves boxes and stearing wheel covers; interior molded articles of, for example, kicking plates and change lever boots; exterior parts of, for example, spoilers, side moles, number plate housings, mirror housings, air dam skirt and mud guards; and other molded articles of automobile parts.

In the electric home appliance and office automation device fields, housings and covering materials of the housings for, for example, television sets, video sets, washing machines, dryers, cleaners, coolers, air-conditioners, remote controller cases, electronic ovens, toasters, coffee makers, pots, thermoses, dish washers, electric razors, hair dryers, microphones, head phones, beauty appliances, compact disk cases, cassette tape cases, personal computers, typewriters, light projectors, telephones, copying machines, facsimile machines, telex machines, etc.

In the sport good fields, decorative parts of sport shoes, grips of rackets, sport tools and goods of various ball games, covering materials of saddles and handlebar grips of bicycles, motor-cycles and tricycles, etc.

In the housing and building fields, covering materials of furnitures, desks, chairs, etc.; covering materials of gates, doors, fences, etc.; wall decorative materials; covering materials of curtain walls; indoor flooring materials of kitchens, wash rooms, toilets, etc; outdoor flooring materials such as verandas, terraces, balconies, carports, etc.; carpets such as front door or entrance mats, table cloths, coasters, ash tray doilys.

In the industrial part field, grips and hoses for electric tools, etc., and the covering materials thereof; packing materials.

In other fields, covering materials of bags, briefcases, cases, files, pocket books, albums, stationarys, camera bodies, dolls and the other toys, and molded articles such as watch bands, outer frames of picture or photograph and their covering materials.

EXAMPLES

The present invention will now be further illustrated by, but is by no means limited to, the following Examples.

The dynamic viscoelasticity, powder properties, moldability, and tensile properties of the molded sheet of the elastomer compositions or the thermoplastic elastomer powders in the Examples and Comparative Examples were measured by the following methods.

DYNAMIC VISCOELASTICITY OF THE ELASTOMER COMPOSITION

Using a dynamic analyzer Model RDS-7700 manufactured by Rheometrics Co., the dynamic viscoelasticities at vibration frequencies of 1 radian/sec. and 100 radian/sec. were measured, and the complex dynamic viscosities $\eta^*(1)$ and $\eta^*(100)$ were calculated. These measurements were conducted in the parallel plate mode, and at an added strain of 5% and a sample temperature of 250° C.

The Newtonian viscosity index n was calculated from the following formula, on the basis of the results of $\eta^*(1)$ and $\eta^*(100)$:

$$n = \{log\eta^*(1) - log\eta^*(100)\}/2.$$

FLOWABILITY OF THE THERMOPLASTIC ELASTOMER POWDER

An amount of 100 ml of the thermoplastic elastomer powder was charged in the funnel of the bulk specific gravity measuring device of JIS K-6721, the dumper withdrawn, and the time (seconds) from the start of the powder dropping until all the powder had dropped was measured.

The best powder flowability is that wherein the dropping is finished in the shortest time.

PRELIMINARY EVALUATION OF POWDER SLUSH MOLDABILITY OF THERMOPLASTIC ELASTOMER POWDER (1) Powder slush moldability An amount 500 g of the elastomer powder was fed onto a nickel electroformed embossed plate having a size of 30 cm×30 cm and a thickness of 3 mm, heated to a surface temperature of 250° C., and adhered for 14 seconds, followed by a discharge of unadhered powder of said elastomer powder, and the powder adhered on embossed plate was heated and melted in a heating furnace under an atmosphere temperature of 280° C. for 60 seconds. The powder slush moldability was preliminary evaluated according to the following standards, from the fused state of the powder on the mold and the properties of the molded sheet obtained by demolding after water cooling the mold to 70° C.:

⊚: powder particles were sufficiently mutually fused, and the tensile strength of the molded sheet was sufficiently high.

○: powder particles were sufficiently mutually fused, and the tensile strength of the molded sheet was high.

Δ: powder particles were mutually fused, but the tensile strength of the molded sheet obtained was low and the molded sheet was brittle.

x: powder particles were not mutually fused, and powder remained on the mold.

⊚ and ○ can be powder slush molded to obtain a final product, but Δ and x cannot be powder slush molded to obtain same.

(2) Demolding force

An amount 250 g of the elastomer powder was feeded onto a nickel electroformed embossed plate having a size of 150 mm×300 mm and a thickness of 3 mm, heated to a surface temperature of 270° C., and adhered for 15 seconds, followed by a discharge of unadhered powder of said elastomer powder, and the powder-adhered embossed plate was heated and melted in a heating furnace under an atmosphere temperature of 280° C. for 60 seconds. Then, the mold temperature was cooled to 70° C., at which a mold release was effected. This operation was repeated 10 times, and on the 10th mold release, the demolding force (peeling strength) between the molded sheet and the mold was measured by using a spring weighing scale. The best demoldability is exhibited at the smallest demolding force per width of 125 mm.

PHYSICAL PROPERTIES OF MOLDED SHEET

The molded sheet obtained in the preliminary evaluation of the powder slush moldability test was punched to form a No. 1 dumbbell test sample as described in JIS K-6301, conditioned under the conditions of 23° C., 50% RH for 24 hours, and then a tensile test was conducted under the same conditions by a tensile tester at a tensile speed of 200 mm/min. to measure the tensile strength at break and the elongation at break.

The hardness was measured by shore D.

REFERENCE EXAMPLE 1

A mixture of 50 parts by weight of an oil-extended EPDM ($ML_{1+4}100°$ C.=53) obtained by adding 100 parts by weight of a mineral oil type softener (Idemitsu Kosan Co., Ltd. Dianaprocess ® PW-380) to 100 parts by weight of an EPDM ($ML_{1+4}100°$ C.=242, propylene content=28% by weight, iodine value=12), 50 parts by weight of a propylene-ethylene random copolymer resin (ethylene content=3% by weight, MFR=60 g/10 min.), and 0.4 part by weight of a crosslinking coagent (Sumifine ® BM-bismaleimide compound, manufactured by Sumitomo Chemical Co., Ltd.) was kneaded by a Banbury mixer for 10 minutes, then formed by an extruder into a masterbatch (hereinafter written as MB) for crosslinking, in the shape of pellets.

To 100 parts by weight of the MB was added 0.04 part by weight of an organic peroxide (Sanperox® APO, manufactured by Sanken Chemical Co., Ltd.), and a dynamic crosslinking was carried out at 220° C. by a twin screw extruder (TEX®)-44, manufactured by The Japan Steel Works LTD.) to obtain elastomer composition pellets. The elastomer composition pellets were cooled at a temperature of $-100°$ C. by liquid $N_2$, and then freeze-pulverized to obtain a thermoplastic elastomer powder. The powder passed through a 32 mesh Tyler standard sieve at a ratio of 99% by weight. This powder was used for a preliminary evaluation of the powder slush moldability. The results are shown in Table 1.

REFERENCE EXAMPLE 2

With the same formulation and under the same conditions as in Reference Example 1, except for using 70 parts by weight of the oil-extended EPDM and 30 parts by weight of the propylene-ethylene random copolymer resin in MB of Reference Example 1, a thermoplastic elastomer powder was obtained. The powder passed through the 32 mesh sieve at a ratio of 98% by weight.

REFERENCE EXAMPLE 3

With the same formulation and under the same conditions as in Reference Example 1, except for using a different propylene-ethylene random copolymer resin (ethylene content=5% by weight, MFR=85 g/10 min.) to that of Reference Example 1, a thermoplastic elastomer powder was obtained. The powder passed through the 32 mesh sieve at a ratio of 99% by weight.

REFERENCE EXAMPLE 4

An elastomer composition were prepared with the same formulation and under the same conditions as in Reference Example 2, except for using 50 parts by weight of the oil-extended EPDM and 20 parts by weight of an ethylene-propylene copolymer rubber ($ML_{1+4}100°$ C.=40, propylene content=53% by weight) in place of 70 parts by weight of the oil-extended EPDM in MB of Reference Example 2, cooled to a temperature of $-80°$ C. and then freeze-pulverized to obtain a thermoplastic elastomer powder. The powder passed through the 32 mesh sieve at a ratio of 96% by weight.

REFERENCE EXAMPLE 5

A thermoplastic elastomer powder was obtained under the same conditions as in Reference Example 1, except for adding 5 parts by weight of a polyethylene resin powder (Flowcens®, manufactured by Sumitomo Seika Chemical Co., Ltd.) as the reagglomeration preventive agent per 100 parts by weight of the thermoplastic elastomer powder in Reference Example 1. The powder passed through the 32 mesh sieve at a ratio of 100% by weight.

REFERENCE EXAMPLE 6

A thermoplastic elastomer powder was obtained with the same formulation and under the same conditions as in Reference Example 1, except for adding 0.5 part by weight of a silicone oil (SH-200 manufactured by Toray Silicone (Co., Ltd.), 100 centistokes) as the mold release agent per 100 parts by weight of the elastomer composition in Reference Example 1. The powder passed through the 32 mesh sieve at a ratio of 100% by weight.

COMPARATIVE REFERENCE EXAMPLE 1

A thermoplastic elastomer powder was obtained with the same formulation and under the same conditions as in Reference Example 1, except for using a polypropylene resin with an MFR of 10 g/10 min. in place of the propylene-ethylene random copolymer resin in MB of Reference Example 1. The powder passed through the 32 mesh sieve at a ratio of 98% by weight.

COMPARATIVE REFERENCE EXAMPLE 2

A thermoplastic elastomer powder was obtained with the same formulation and under the same conditions as in Reference Example 2, except for using the propylene-ethylene random copolymer with an MFR of 1.2 g/10 min. in place of the propylene-ethylene random copolymer resin in MB of Reference Example 2. The powder passed through the 32 mesh sieve at a ratio of 99% by weight.

COMPARATIVE REFERENCE EXAMPLE 3

A mixture of 80 parts by weight of the oil-extended EPDM used in Reference Example 1, 20 parts by weight of a homopolypropylene (MFR=0.5 g/10 min.) and 1.0 part by weight of Sumifine® BM as the crosslinking coagent was kneaded by a Banbury mixer to form a masterbatch for crosslinking.

To 100 parts by weight of the masterbatch, 0.3 part by weight of Sanperox® APO were added, and the mixture was subjected to a dynamic crosslinking at 220° C. by a twin screw extruder, to obtain pellets of an elastomer composition.

The elastomer composition pellets were pulverized as in Reference Example 1, to obtain a thermoplastic elastomer powder. The powder passed through the 32 mesh sieve at a ratio of 98% by weight.

COMPARATIVE REFERENCE EXAMPLE 4

A mixture of 60 parts by weight of an EPDM (propylene=50% by weight, $ML_{1+4}100°$ C.=86, iodine value=8), 20 parts by weight of an EPM (propylene=53% by weight, $ML_{1+4}100°$ C.=43) and 20 parts by weight of a homo-polypropylene (MFR=10 g/10 min.) was kneaded by a Banbury mixer to prepare a masterbatch for crosslinking.

To 100 parts by weight of the masterbatch, 0.28 part by weight of Sanperox APO® were added, and the mixture was subjected to a dynamic crosslinking by a twin screw extruder, to obtain pellets of an elastomer composition.

The elastomer composition pellets were pulverized as in Example 1, to obtain a thermoplastic elastomer powder. The elastomer powder passed through the 32 mesh sieve at a ratio of 100% by weight.

COMPARATIVE REFERENCE EXAMPLE 5

A mixture of 52 parts by weight of an oil-extended EPDM ($ML_{1+4}100°$ C.=78) obtained by adding 40 parts by weight of a mineral oil type softener (Dianaprocess® PW-380) to 100 parts by weight of an EPDM ($ML_{1+4}100°$ C.=145, propylene content=36% by weight, iodine value= 10), 27 parts by weight of a homo-polypropylene resin (MFR=20 g/10 min.), 21 parts by weight of a propylene-butene-1 random copolymer resin (butene-1 content=24% by weight, MFR=4 g/10 min.) and 0.2 part by weight of a crosslinking coagent (Sumifine ® BM) was kneaded in a Banbury mixer, to prepare a masterbatch for crosslinking.

To 100 parts by weight of the masterbatch, 0.23 part by weight of an organic peroxide (Sanperox ® TY—1, 3, manufactured by Sanken Chemical Co., Ltd.) was added and a dynamic crosslinking was effected by a twin screw extruder to form pellets of an elastomer composition. Subsequently, the elastomer composition pellets were pulverized as in Reference Example 1, to obtain a thermoplastic elastomer powder.

The results of an investigation of the use of the powders obtained in Reference Examples 2 to 6 and Comparative Reference Examples 1 to 5 are shown in Tables 1-3 and 8-10.

EXAMPLE 1

Figure 1:
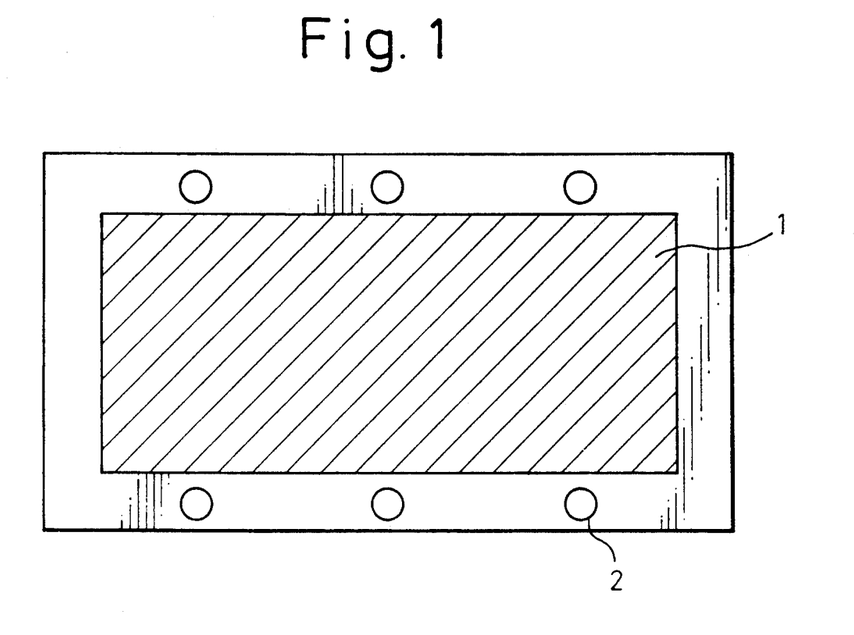
FIG. 1 is a plan view of the powder feeding box of the powder slush molding apparatus used in the Examples.
Figure 2:
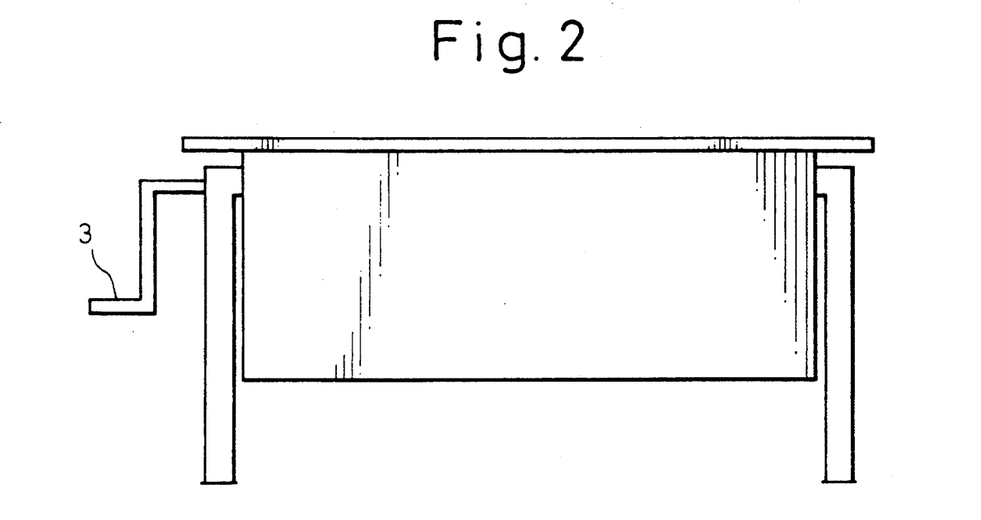
FIG. 2 is an elevational view of the powder feeding box of the powder slush molding apparatus used in the Examples.
Figure 3:
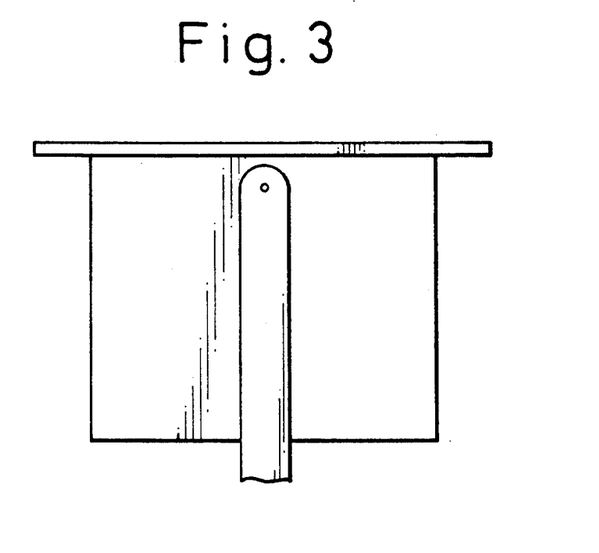
FIG. 3 is a side view of the powder feeding box of the powder slush molding apparatus used in the Examples.
Figure 4:
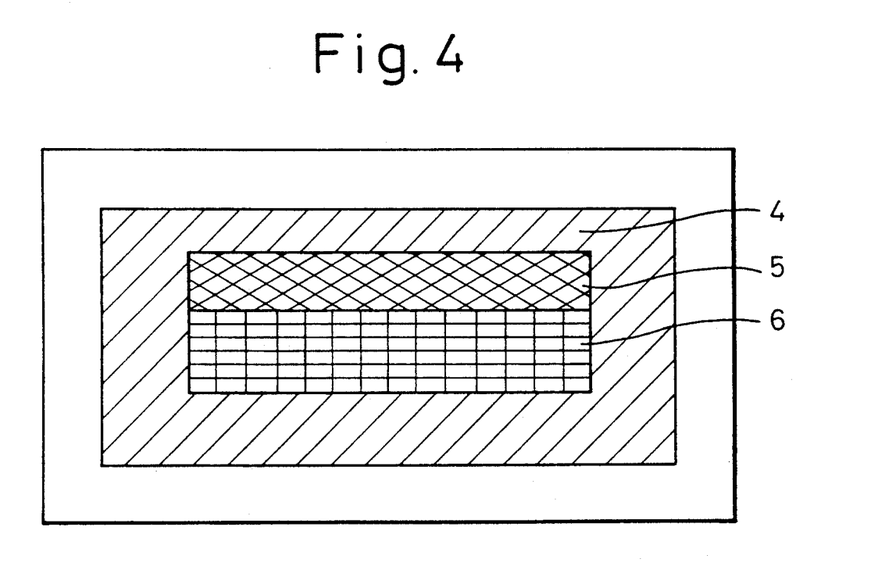
FIG. 4 is a plan view of the mold of the powder slush molding apparatus used in the Examples.
Figure 5:
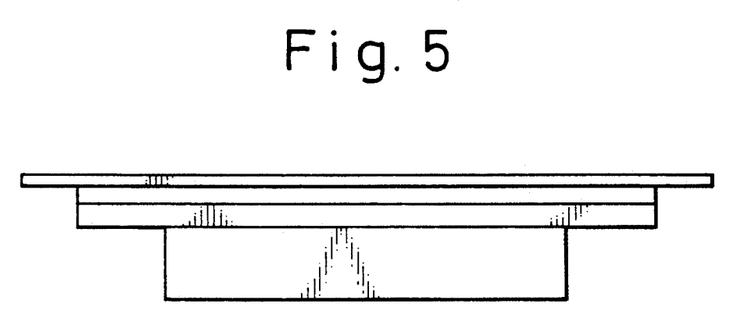
FIG. 5 is an elevational view of the mold of the powder slush molding apparatus used in the Examples.
Figure 6:
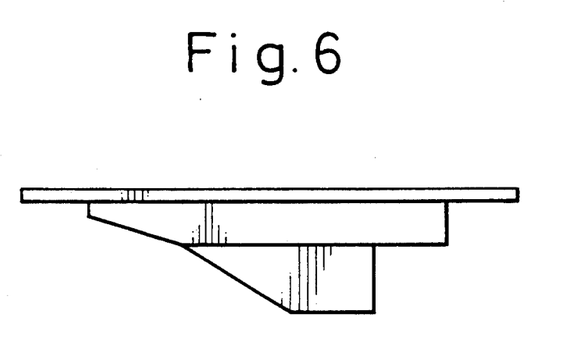
FIG. 6 is a side view of the mold of the powder slush molding apparatus used in the Examples.

An amount of 4 kg of the thermoplastic elastomer powder obtained in Reference Example 1 was thrown into a square vessel (powder feeding box) made of a stainless steel and having a rectangular opening 1 (600 mm × 220 mm) with a depth of 210 mm, mounted on a monoaxial rotational device as shown in FIG. 1 to FIG. 3. Further, as shown in FIG. 4 to FIG. 6, a nickel electroformed mold with a complicated shape having a rope pattern 5 and a leather emboss pattern 6, and having a thickness of 3 mm and an opening 4 of the same size as the opening 1 of the powder feeding box, was preheated in a gas furnace at 300° C. When the surface temperature of the mold became 250° C., the heated mold was immediately placed with the opening 4 (600 mm × 220 mm) thereof downward on the above-mentioned powder feeding box, to match the opening 1, and the outer frames mounted around both openings were brought into close contact and fixed by a clip 2. Immediately thereafter, the assembly was rotated twice in the clockwise direction at a rate of 30 r.p.m and twice in the anticlockwise direction at a rate of 30 r.p.m. Then, the assembly was once rocked to an angle of about 120° in the clockwise direction and in the anticlockwise direction, to clear off excess powder attached to the complicated shape portion.

While the opening 4 faced downward, the rotation and rocking operations were stopped, and the mold was dismantled from the powder feeding box, post-heated in a heated furnace at 280° C. for one minute, cooled with water, and the molded sheet then demolded.

The molded sheet was obtained as a product having a weight of 200 g and a thickness of 0.9 to 1.1 mm, without defects, and with excellent uniformity of the thickness fully reproduced even to the fine portion of the mold having a complicated shape, i.e., the rope pattern and the leather emboss pattern were faithfully reproduced, and without pinholes.

From the vessel was recovered 3.8 kg of the elastomer powder without an entrainment of foreign matter, and by adding unused elastomer powder to the recovered elastomer powder to a total weight of 4 kg, the molding was again effected according to the same procedure, and as a result, a product having an excellent appearance and thickness uniformity was again obtained.

REFERENCE EXAMPLE 7

To 100 parts by weight of propylene-butene-1 random copolymer resin (butene-1 content = 12.7 wt %, MFR = 2.5 g/10 min) was added 0.05 parts by weight of an organic peroxide (Perhexa ® 25B manufactured by Nippon Yushi K.K.) and the decomposition reaction was carried out at 220° C. using a 65 mmφ single screw extruder to obtain a resin having an MFR of 65 g/10 min.

A thermoplastic elastomer powder was obtained in a similar manner as in Reference Example 1, except that 60 parts by weight of this resin was used instead of 50 parts by weight of the propylene-ethylene random copolymer resin, and 40 parts by weight of the oil extended EPDM was used. The powder passed through the 32 mesh Tyler standard sieve at a ratio of 99% by weight.

REFERENCE EXAMPLE 8

To 100 parts by weight of the propylene-butene-1 random copolymer resin used in Reference Example 7 was added 0.09 parts by weight of an organic peroxide (Perhexa ® 25B manufactured by Nippon Yushi K.K.) and a resin having an MFR of 130 g/10 min was obtained in a similar manner as in Reference Example 7.

A thermoplastic elastomer powder was obtained with the same formulation and under the same conditions as in Reference Example 7, except that the above-mentioned resin was used instead of the resin used in MB of Reference Example 7. The powder passed through the 32 mesh Tyler standard sieve at a ratio of 99% by weight.

REFERENCE EXAMPLE 9

To 100 parts by weight of the propylene-butene-1 random copolymer resin (butene content = 24.4 wt %, MFR = 2.2 g/10 min) was added 0.08 parts by weight of an organic peroxide (Perhexa ® 25B, manufactured by Nippon Yushi K.K.) and a resin having an MFR of 60 g/10 min was obtained in a similar manner as in Reference Example 7.

A thermoplastic elastomer powder was obtained with the same formulation and under the same conditions as in Reference Example 7, except that the above-mentioned resin was used instead of the resin obtained in MB of Reference Example 7. The powder passed through the 32 mesh Tyler standard sieve at a ratio of 99% by weight.

REFERENCE EXAMPLE 10

To 100 parts by weight of the propylene-butene-1 random copolymer resin used in Reference Example 9 was added 0.11 parts by weight of an organic peroxide (Perhexa ® 25B, manufactured by Nippon Yushi K.K.) and a resin having an MFR of 105 g/10 min was obtained.

A thermoplastic elastomer powder was obtained with the same formulation and under the same conditions as in Reference Example 7, except that the above-mentioned resin was used instead of the resin obtained in MB of Reference Example 7. The powder passed through a Tyler standard sieve at a ratio of 99% by weight.

REFERENCE EXAMPLE 11

To 100 parts by weight of the propylene-butene-1 random copolymer resin used in Reference Example 9 was added 0.10 part by weight of an organic peroxide (Perhexa ® 25B, manufactured by Nippon Yushi K.K.) and a resin having an MFR of 92 g/10 min was obtained in a similar manner as in Reference Example 7.

A thermoplastic elastomer powder was obtained with the same formulation and under the same conditions as in Reference Example 7, except that the above resin was used instead of the resin obtained and 0.2 parts by weight of a mold release agent (SH-200 manufactured by Toray Silicone Co., Ltd., the viscosity at 25° C.=100 centistokes), based upon 100 parts by weight of the total amount of the above-mentioned resin and the oil extruded EPDM, was added in MB of Reference Example 7. This powder passed through a 32 mesh Tyler standard sieve at a ratio of 99% by weight.

REFERENCE EXAMPLE 12

An elastomer composition was obtained with the same formulation and under the same conditions as in Reference Example 1, except that the amount of the oil-extended EPDM in Reference Example 1 was changed to 80 parts by weight and 20 parts by weight of propylene-ethylene random copolymer resin (ethylene content=3 wt %, MFR=1.5 g/10 min) was used in MB of Reference Example 1.

A 50 parts by weight amount of the elastomer composition and 50 parts by weight of the propylene-butene-1 random copolymer resin having an MFR of 105 g/10 min obtained in Reference Example 10 were melt blended at 160° C. using a 65 mm$\phi$ single screw extruder to obtain the composition in the form of pellets. The resultant composition in the form of pellets was pulverized under similar conditions as in Reference Example 1 to obtain the thermoplastic elastomer powder. This powder passed through a 32 mesh Tyler standard sieve at a ratio of 99% by weight.

REFERENCE EXAMPLE 13

A composition in the form of pellets was obtained by dynamically heat treating 50 parts by weight of the elastomer composition obtained in Reference Example 12, 50 parts by weight of the propylene-butene-1 random copolymer resin having an MFR of 92 g/10 min obtained in Reference Example 11, and 0.08 parts by weight of an organic peroxide (Sanperox ® APO, manufactured by Sanken Chemical Co., Ltd.) at 220° C. using a twin screw extruder (TEX ®-44, manufactured by The Japan Steel Works LTD.). The resultant composition pellets were pulverized under similar conditions as in Reference Example 1 to obtain the thermoplastic elastomer powder. The powder passed through a 32 mesh Tyler standard sieve at a ratio of 99% by weight.

EXAMPLE 2

An amount of 4 kg of the thermoplastic elastomer powder obtained in Reference Example 11 was thrown into a square vessel (powder feeding box) made of a stainless steel and having a rectangular opening 1 (600 mm×220 mm) with a depth of 210 mm, mounted on a monoaxial rotational device as shown in FIG. 1 to FIG. 3. Further, as shown in FIG. 4 to FIG. 6, a nickel electroformed mold with a complicated shape having a rope pattern 5 and a leather emboss pattern 6, and having a thickness of 3 mm and an opening 4 of the same size as the opening 1 of the powder feeding box, was preheated in a gas furnace at 300° C. When the surface temperature of the mold became 250° C., the heated mold was immediately placed with the opening 4 (600 mm×220 mm) thereof downward on the above-mentioned powder feeding box, to match the opening 1, and the outer frames mounted around both openings were brought into close contact and fixed by a clip 2. Immediately thereafter, the assembly was reversely rotated at a rate of 30 r.p.m. and was held for about 15 seconds in such a condition that the opening 4 faced upward and then was reversely rotated to an angle of 180° C. at the same direction and the same speed.

While the opening 4 faced downward, the rotation and rocking operations were stopped, and the mold was dismantled from the powder feeding box, post-heated in a heated furnace at 300° C. for one minute, cooled with water, and the molded sheet then demolded.

The molded sheet was easily demolded and the demoldability was good.

The molded sheet was obtained as a product having a weight of 268 g and a thickness of 1.6 to 1.7 mm, without defects, and with excellent uniformity of the thickness fully reproduced even to the fine portion of the mold having a complicated shape, i.e., the rope pattern and the leather emboss pattern were faithfully reproduced, and without pinholes.

EXAMPLE 3

The procedure of Example 2 was similarly carried out until the mold was dismantled from the powder feeding box, except that the assembly of the integrated mold and powder feeding box was kept for 5 seconds, instead of 15 seconds in Example 2 in such a state that the assembly was reversely rotated to an angle of 180° C. After the dismantled mold was allowed to cool at room temperature for one minute, the molded sheet was demolded.

The molded sheet was easily demolded and the demoldability was good.

The molded sheet was obtained as a product having a weight of 175 g and a thickness of 1.15 mm, without defects, and with an excellent uniformity of the thickness fully reproduced even to the fine portion of the mold having a complicated shape, i.e., the rope pattern and the leather emboss pattern were faithfully reproduced, and without pinholes.

EXAMPLE 4

The procedure of Example 3 was similarly carried out except that the mold surface temperature of 250° C. in Example 3 was changed to 190° C.

The molded sheet was easily demolded and the demoldability was good.

The molded sheet was obtained as product having a weight of 144 g and a thickness of 0.92 mm, without defects, and with an excellent uniformity of the thickness fully reproduced even to the fine portion of the mold having a complicated shape, i.e., the rope pattern and the leather emboss pattern were faithfully reproduced, and without pinholes.

EXAMPLE 5

The procedure similar to that of Example 4 was carried out except that the mold surface temperature of 190° C. in Example 4 was changed to 230° C. and that the integrated mold and powder feeding box was kept for 3 seconds, instead of 5 seconds in Example 4 in such a state that the mold and the powder feeding box were reversely rotated to an angle of 180° C. The molded sheet was easily demolded and the demoldability was good.

The molded sheet was obtained as a product having a weight of 125 g and a thickness of 0.82 mm, without defects, and with an excellent uniformity of the thickness fully reproduced even to the fine portion of the mold having a complicated shape, i.e., the rope pattern and the leather emboss pattern were faithfully reproduced, and without pinholes.

EXAMPLE 6

The procedure of Example 5 was similarly carried out except that the mold surface temperature of 230° C. in Example 5 was changed to 180° C. The molded sheet was easily demolded and the demoldability was good.

The molded sheet was obtained as product having a weight of 109 g and a thickness of 0.75 mm, without defects, and with an excellent uniformity of the thickness fully reproduced even to the fine portion of the mold having a complicated shape, i.e., the rope pattern and the leather emboss pattern were faithfully reproduced, and without pinholes.

COMPARATIVE REFERENCE EXAMPLE 6

Component A: Ethylene-propylene-ethylidenenorbornene terpolymer rubber having a ethylene/propylene unit ratio (weight) of 78/22, an iodine value of 12, and a Mooney viscosity ($ML_{1+4}$, 121° C.) of 55.

Component B: Isotactic polypropylene resin having a melt index of 13 g/10 min (230° C.).

Component C: Naphthenic process oil.

Component D: Mixture of 20% by weight of 1,3-bis(-tert-butylperoxyisopropyl)benzene, 30% by weight of divinylbenzene and 50% by weight of paraffinic mineral oil.

A 55 parts by weight of the above-mentioned component A, 45 parts by weight of the component B and 30 parts by weight of the components C were kneaded at a temperature of 180° C. for 5 minutes by a Banbury mixer and the resultant mixture was cut by a sheet cutter to form pellets.

A 100 parts by weight of the pellets obtained above was mixed with one part by weight of the component D in a henschel mixer and the mixture was extruded at 220° C. through a twin screw extruder (TEX®-44, manufactured by The Japan Steel Works LTD.) to obtain the thermoplastic elastomer pellets.

The thermoplastic elastomer pellets obtained above was pulverized under the same conditions as in Reference Example 1 to obtain the thermoplastic elastomer powder. The powder passed a 32 mesh Tyler standard sieve at a ratio of 98% by weight.

COMPARATIVE REFERENCE EXAMPLE 7

A thermoplastic elastomer powder was obtained in the same manner as in Comparative Example 6, except that the amounts of the components A and B were changed to 80 parts by weight and 20 parts by weight, respectively, and 10 parts by weight of the component E [butyl rubber (IIR065, manufactured by Esso)] were added, this powder passed through a 32 mesh Tyler standard sieve at a ratio of 98% by weight.

A preliminary evaluation of powder slush molding was carried out in the same manner as in Reference Example 1, but as the result, the powder particles were not fused to each other, and only a molded sheet which easily crumbled was obtained.

COMPARATIVE REFERENCE EXAMPLE 8

A thermoplastic elastomer powder was obtained in the same manner as in Comparative Reference Example 6, except that the component C was not used.

This powder passed through a 32 mesh Tyler standard sieve at a ratio of 98% by weight.

COMPARATIVE EXAMPLE 1

The procedure of Example 1 was similarly carried out, except that the thermoplastic elastomer powder obtained in Comparative Reference Example 6 instead of the thermoplastic elastomer powder obtained in Reference Example 1.

The resultant molded sheet was such that the powder particles were fused, but the fusion was not sufficient to the determination for tensile strength.

The results of the preliminary evaluation of the powder slush moldability of Reference Example 7-13 and Comparative Reference Example 6-8 are shown in Table 4-7 and 10-11.

The physical properties of the molded articles of Examples 1-6 are shown in Table 12.

TABLE 1

|  | Reference Example 1 | Reference Example 2 |
|---|---|---|
| Dynamic viscoelasticity of elastomer composition |  |  |
| $\eta^*(1)$ [poise] | $1.6 \times 10^4$ | $1.3 \times 10^5$ |
| $\eta^*(100)$ [poise] | $1.8 \times 10^3$ | $5.9 \times 10^3$ |
| Newtonian viscosity index n | 0.48 | 0.67 |
| Powder properties |  |  |
| Powder flowability [sec] | 24 | 30 |
| Moldability |  |  |
| Powder slush moldability | ⊚ | c |
| Demolding force [g/125 mm width] | 380 | 340 |
| Physical properties of molded sheet |  |  |
| Tensile Strength at break [kg/cm²] | 124 | 62 |
| Elongation at break [%] | 580 | 450 |
| Hardness (Shore D) | 41 | 29 |

TABLE 2

|  | Reference Example 3 | Reference Example 4 |
|---|---|---|
| Dynamic viscoelasticity of elastomer composition |  |  |
| $\eta^*(1)$ [poise] | $1.7 \times 10^4$ | $1.4 \times 10^5$ |
| $\eta^*(100)$ [poise] | $1.7 \times 10^3$ | $6.7 \times 10^3$ |
| Newtonian viscosity index n | 0.50 | 0.66 |
| Powder properties |  |  |
| Powder flowability [sec] | 27 | 24 |
| Moldability |  |  |
| Powder slush moldability | ⊚ | ○ |
| Demolding force [g/125 mm width] | 420 | 320 |
| Physical properties of molded sheet |  |  |
| Tenslie Strength at break [kg/cm²] | 110 | 50 |
| Elongation at break [%] | 540 | 360 |
| Hardness (Shore D) | 38 | 30 |

TABLE 3

|  | Reference Example 5 | Reference Example 6 |
|---|---|---|
| Dynamic viscoelasticity of elastomer composition |  |  |
| $\eta^*(1)$ [poise] | $1.6 \times 10^4$ | $1.7 \times 10^4$ |
| $\eta^*(100)$ [poise] | $1.8 \times 10^3$ | $1.8 \times 10^3$ |
| Newtonian viscosity index n | 0.48 | 0.49 |
| Powder properties |  |  |
| Powder flowability [sec] | 16 | 22 |
| Moldability |  |  |
| Powder slush moldability | ⊚ | ⊚ |
| Demolding force [g/125 mm width] | 370 | 100 |
| Physical properties of molded sheet |  |  |
| Tensile Strength at break [kg/cm²] | 118 | 122 |
| Elongation at break [%] | 540 | 550 |
| Hardness (Shore D) | 41 | 38 |

TABLE 4

| | Reference Example 7 | Reference Example 8 |
|---|---|---|
| Dynamic viscoelasticity of elastomer composition | | |
| $\eta^*(1)$ [poise] | $8.8 \times 10^3$ | $5.7 \times 10^3$ |
| $\eta^*(100)$ [poise] | $1.4 \times 10^3$ | $9.9 \times 10^2$ |
| Newtonian viscosity index n | 0.40 | 0.38 |
| Powder properties | | |
| Powder flowability [sec] | 22 | 24 |
| Moldability | | |
| Powder slush moldability | ⊚ | ⊚ |
| Demolding force [g/125 mm width] | 330 | 350 |
| Physical properties of molded sheet | | |
| Tensile Strength at break [kg/cm$^2$] | 130 | 130 |
| Elongation at break [%] | 630 | 640 |
| Hardness (Shore D) | 47 | 45 |

TABLE 5

| | Reference Example 9 | Reference Example 10 |
|---|---|---|
| Dynamic viscoelasticity of elastomer composition | | |
| $\eta^*(1)$ [poise] | $4.6 \times 10^3$ | $6.8 \times 10^3$ |
| $\eta^*(100)$ [poise] | $1.2 \times 10^3$ | $1.7 \times 10^3$ |
| Newtonian viscosity index n | 0.29 | 0.30 |
| Powder properties | | |
| Powder flowability [sec] | 24 | 23 |
| Moldability | | |
| Powder slush moldability | ⊚ | ⊚ |
| Demolding force [g/125 mm width] | 320 | 320 |
| Physical properties of molded sheet | | |
| Tensile Strength at break [kg/cm$^2$] | 140 | 140 |
| Elongation at break [%] | 640 | 630 |
| Hardness (Shore D) | 42 | 38 |

TABLE 6

| | Reference Example 11 | Reference Example 12 |
|---|---|---|
| Dynamic viscoelasticity of elastomer composition | | |
| $\eta^*(1)$ [poise] | $6.8 \times 10^3$ | $2.3 \times 10^4$ |
| $\eta^*(100)$ [poise] | $1.2 \times 10^3$ | $2.4 \times 10^3$ |
| Newtonian viscosity index n | 0.38 | 0.49 |
| Powder properties | | |
| Powder flowability [sec] | 24 | 25 |
| Moldability | | |
| Powder slush moldability | ⊚ | ⊚ |
| Demolding force [g/125 mm width] | 150 | 310 |
| Physical properties of molded sheet | | |
| Tensile Strength at break [kg/cm$^2$] | 140 | 100 |
| Elongation at break [%] | 640 | 550 |
| Hardness (Shore D) | 41 | 45 |

TABLE 7

| | Reference Example 13 |
|---|---|
| Dynamic viscoelasticity of elastomer composition | |
| $\eta^*(1)$ [poise] | $2.4 \times 10^4$ |
| $\eta^*(100)$ [poise] | $1.4 \times 10^3$ |
| Newtonian viscosity index n | 0.61 |
| Powder properties | |
| Powder flowability [sec] | 24 |
| Moldability | |
| Powder slush moldability | ⊚ |
| Demolding force [g/125 mm width] | 330 |
| Physical properties of molded sheet | |
| Tensile Strength at break [kg/cm$^2$] | 100 |
| Elongation at break [%] | 480 |
| Hardness (Shore D) | 43 |

TABLE 8

| | Comparative Reference Example 1 | Comparative Reference Example 2 |
|---|---|---|
| Dynamic viscoelasticity of elastomer composition | | |
| $\eta^*(1)$ [poise] | $2.3 \times 10^5$ | $1.9 \times 10^5$ |
| $\eta^*(100)$ [poise] | $6.8 \times 10^3$ | $8.0 \times 10^3$ |
| Newtonian viscosity index n | 0.76 | 0.69 |
| Powder properties | | |
| Powder flowability [sec] | 26 | 31 |
| Moldability | | |
| Powder slush moldability | x | Δ |
| Demolding force [g/125 mm width] | unmeasurable | unmeasurable |
| Physical properties of molded sheet | | |
| Tensile Strength at break [kg/cm$^2$] | unmeasurable | 10 |
| Elongation at break [%] | unmeasurable | 25 |
| Hardness (Shore D) | unmeasurable | 29 |

TABLE 9

| | Comparative Reference Example 3 | Comparative Reference Example 4 |
|---|---|---|
| Dynamic viscoelasticity of elastomer composition | | |
| $\eta^*(1)$ [poise] | $7.0 \times 10^5$ | $5.7 \times 10^5$ |
| $\eta^*(100)$ [poise] | $1.2 \times 10^4$ | $1.5 \times 10^4$ |
| Newtonian viscosity index n | 0.88 | 0.79 |
| Powder properties | | |
| Powder flowability [sec] | 42 | 36 |
| Moldability | | |
| Powder slush moldability | x | x |
| Demolding force [g/125 mm width] | unmeasurable | unmeasurable |
| Physical properties of molded sheet | | |
| Tensile Strength at break [kg/cm$^2$] | unmeasurable | unmeasurable |
| Elongation at break [%] | unmeasurable | unmeasurable |
| Hardness (Shore D) | unmeasurable | unmeasurable |

TABLE 10

| | Comparative Reference Example 5 | Comparative Reference Example 6 |
|---|---|---|
| Dynamic viscoelasticity of elastomer composition | | |
| $\eta^*(1)$ [poise] | $1.9 \times 10^5$ | $1.2 \times 10^5$ |
| $\eta^*(100)$ [poise] | $4.2 \times 10^3$ | $5.2 \times 10^3$ |
| Newtonian viscosity index n | 0.83 | 0.69 |
| Powder properties | | |
| Powder flowability [sec] | 34 | 32 |
| Moldability | | |
| Powder slush moldability | x | Δ |
| Demolding force [g/125 mm width] | unmeasurable | 580 |
| Physical properties of molded sheet | | |
| Tensile Strength at break [kg/cm$^2$] | unmeasurable | 20 |
| Elongation at break [%] | unmeasurable | 30 |
| Hardness (Shore D) | unmeasurable | 30 |

TABLE 11

| | Comparative Reference Example 7 | Comparative Reference Example 8 |
|---|---|---|
| Dynamic viscoelasticity of elastomer composition | | |
| $\eta^*(1)$ [poise] | $5.1 \times 10^5$ | $3.2 \times 10^5$ |

TABLE 11-continued

|  | Comparative Reference Example 7 | Comparative Reference Example 8 |
|---|---|---|
| $\eta^*(100)$ [poise] | $9.0 \times 10^4$ | $1.1 \times 10^4$ |
| Newtonian viscosity index n | 0.75 | 0.74 |
| Powder properties | | |
| Powder flowability [sec] | 40 | 40 |
| Moldability | | |
| Powder slush moldability | x | x |
| Demolding force [g/125 mm width] | unmeasurable | unmeasurable |
| Physical properties of molded sheet | | |
| Tensila Strength at break [kg/cm$^2$] | unmeasurable | unmeasurable |
| Elongation at break [%] | unmeasurable | unmeasursble |
| Hardness (Shore D) | unmeasurable | unmeasurable |

TABLE 12

| | Physical Properties of Molded Article | | |
|---|---|---|---|
| | Tensile strength at break [kg/cm$^2$] | Elongation at break [%] | Hardness (Shore D) |
| Example 1 | 100 | 560 | 40 |
| Example 2 | 140 | 630 | 39 |
| Example 3 | 130 | 590 | 40 |
| Example 4 | 130 | 610 | 39 |
| Example 5 | 125 | 570 | 41 |
| Example 6 | 126 | 580 | 41 |

As described above, according to the present invention, there can be provided a thermoplastic elastomer powder for powder slush molding which can obtain a molding having a sufficiently high thermal fusion strength between powder particles, without pinholes, by using a thermoplastic elastomer powder having a high flowability even when substantially no forming pressure is applied, a powder slush molding method using the same, and the molded articles thereof.

We claim:

1. A thermoplastic elastomer powder for powder slush molding, comprising a partially crosslinked type elastomer composition comprising a mixture of an ethylene-α-olefin copolymer rubber and a polyolefin resin dynamically crosslinked in the presence of a crosslinking agent, wherein said elastomer composition has a complex dynamic viscosity $\eta^*(1)$ as measured at a frequency of 1 radian/sec. in a dynamic viscoelasticity measurement at 250° C., of $1.5 \times 10^5$ poise or less, a Newtonian viscosity index n calculated from the following formula by using the complex dynamic viscosity $\eta^*(1)$ at a frequency of 1 radian/sec. and the complex dynamic viscosity $\eta^*(100)$ at a frequency of 100 radian/sec. of 0.67 or less:

$$n = \{log\eta^*(1) - log\eta^*(100)\}/2.$$

2. A thermoplastic elastomer powder as claimed in claim 1, wherein the ethylene-α-olefin copolymer rubber is an ethylene-propylene-nonconjugated diene copolymer rubber.

3. A thermoplastic elastomer powder as claimed in claim 1, wherein the ethylene-α-olefin copolymer rubber is an oil-extended olefin copolymer rubber comprising 30 to 120 parts by weight of a mineral oil type softener formulated per 100 parts by weight of an ethylene-α-olefin copolymer rubber having a Mooney viscosity $(ML_{1+4}100° C.)$ of 130 to 350 as measured at 100° C. according to ASTM D-927-57T.

4. A thermoplastic elastomer powder as claimed in claim 1, wherein the polyolefin resin is a polypropylene or a copolymer of propylene and an α-olefin.

5. A thermoplastic elastomer powder as claimed in claim 1, wherein the polyolefin resin is a polyolefin resin having a melt flow rate MFR of 20 g/10 min. or more as measured at 230° C. under load of 2.16 kg according to JIS K-7210.

6. A thermoplastic elastomer powder as claimed in claim 1, wherein a crosslinking coagent is used in combination in a dynamic crosslinking.

7. A thermoplastic elastomer powder as claimed in claim 1, wherein the crosslinking agent is an organic peroxide.

8. A thermoplastic elastomer powder as claimed in claim 1, wherein the crosslinking agent is a dialkyl peroxide.

9. A thermoplastic elastomer powder as claimed in claim 6, wherein the crosslinking coagent is a bismaleimide compound.

10. A thermoplastic elastomer powder as claimed in claim 1, which is pulverized until 95% by weight or more thereof passes through a 32 mesh Tyler standard sieve.

11. A thermoplastic elastomer powder, comprising 0.2 to 20 parts by weight of a polyolefin resin powder added as a mutual adhesion preventive agent based on 100 parts by weight of the elastomer powder according to claim 1.

12. A thermoplastic elastomer powder, comprising 50 parts by weight or less of an ethylene-α-olefin copolymer rubber and/or a polyolefin resin blended based on 100 parts by weight of the elastomer composition according to claim 1.

13. A thermoplastic elastomer powder, comprising 2 parts by weight or less of a methylpolysiloxane compound added based on 100 parts by weight of the elastomer composition or the elastomer powder according to claim 1.

14. A thermoplastic elastomer powder as claimed in claim 13, wherein the methylpolysiloxane compound is a methylpolysiloxane compound having a viscosity at 25° C. of 20 centistokes or more.

15. A thermoplastic elastomer powder as claimed in claim 13, wherein the methylpolysiloxane compound is dimethylpolysiloxane.

* * * * *